United States Patent [19]
Fallas

[11] Patent Number: 5,326,218
[45] Date of Patent: Jul. 5, 1994

[54] ROBOTIC ARM FOR HANDLING PRODUCT

[76] Inventor: David M. Fallas, 300 Leafy Hollow La., McGregor, Tex. 76657

[21] Appl. No.: 27,748

[22] Filed: Mar. 8, 1993

[51] Int. Cl.$^5$ .................................................. B66C 1/02
[52] U.S. Cl. ..................................... 414/733; 414/737; 414/738; 74/105; 901/15
[58] Field of Search .............. 414/733, 734, 737, 738; 901/15; 198/468.4, 464.2; 74/42, 105, 479 B

[56] References Cited

U.S. PATENT DOCUMENTS

| | | |
|---|---|---|
| 1,766,573 | 6/1930 | Westin .................... 414/733 |
| 2,941,676 | 6/1960 | Harker . |
| 2,948,417 | 8/1960 | Haanes .................... 414/733 |
| 2,956,384 | 10/1960 | Underwood . |
| 3,389,906 | 6/1968 | Walton . |
| 3,445,980 | 5/1969 | Salomon . |
| 3,488,917 | 1/1970 | Oswald et al. . |
| 3,512,336 | 5/1970 | Rosecrans . |
| 3,590,972 | 7/1971 | Mosterd . |
| 3,673,756 | 7/1972 | Prete et al. . |
| 3,673,759 | 7/1972 | Ayres et al. ............... 198/468.4 X |
| 3,680,395 | 8/1972 | Douglas ..................... 74/42 |
| 3,729,085 | 2/1973 | Schlueter . |
| 3,778,965 | 12/1973 | O'Lenick et al. . |
| 3,783,584 | 1/1974 | Rauser . |
| 3,914,919 | 10/1975 | Boissy et al. . |
| 4,113,124 | 9/1978 | Muntjanoff ............... 414/734 |
| 4,356,906 | 11/1982 | Fallas . |
| 4,398,383 | 8/1983 | Prakken . |
| 4,583,351 | 4/1986 | Fallas . |
| 4,768,328 | 9/1988 | Mims . |
| 4,864,801 | 9/1989 | Fallas . |

OTHER PUBLICATIONS

Brochure for Fallas (Brand) Model Index 100–Automatic Case Packer for Lay Flat Flexible Bags.
Schubert (Brand) Packaging Robots Brochure.
Hulbritt (Brand) "Flexi Packer" Brochure.
Dyna-Pak (Brand) Case Packers Brochure.
Advertisement for a Salwasser (Brand) Case Loading Machine.
Flyer: Fallas Automatic Case Loader ACL-CP.
Brochure: Fallas "SLA Auto" Case Packer.
McGraw-Hill Encyclopedia of Science & Technology, pp. 98–99; 516–522; 537; 572–576.

Primary Examiner—Michael S. Huppert
Assistant Examiner—Donald W. Underwood
Attorney, Agent, or Firm—Arnold, White & Durkee

[57] ABSTRACT

A robotic arm for moving product from a first handling station to a second handling station is disclosed. The robotic arm includes a support structure and a driven shaft mounted to the support structure. The driven shaft is adapted for rotation about a first axis. A device is provided for selectively oscillating the shaft through successive, selected arcs of rotation. A crank arm is secured to the driven shaft at a first point such that the crank arm is rotated about the first axis. A linkage member is rotatably secured to the support structure for rotation about a second axis. The linkage member is rotatably secured to the support structure at a first linkage pivot point on the linkage member. The crank arm and the linkage member are interconnected by an elongated boom member having a first end, a cranking point and a product handling end. The boom member is pivotally connected at its first end to the linkage member. The boom member is further pivotally connected at its cranking point to the crank arm. The interrelationship among these members is such that when the crank arm is selectively oscillated, the crank arm causes movement of the product handling end of the boom in a path having an arcuate component and an approximately straight line component for handling product.

5 Claims, 6 Drawing Sheets

ROBOTIC ARM FOR HANDLING PRODUCT

BACKGROUND OF THE INVENTION

The invention relates generally to robotic pick and place mechanisms for handling sequentially delivered product. More particularly, it concerns an improved robotic arm mechanism for movement of product from a conveyor or similar handling station into a container for storage or shipping.

A common problem encountered in product handling is presented by the need to move product from a conveyor to a shipping container. This movement is preferably accomplished in a manner that maximizes use of the space within the container while minimizing damage to the product.

One type of apparatus that has been used to move product from a conveyor or similar handling station to a container is a robotic pick and place mechanism. Examples of such mechanisms in the marketplace include the Rodico-Schubert SNC-F2 (brand) Multi-packer and the ADEPT (brand) robot. This type of apparatus allows for precise handling of an individual product or a group of products.

Figure 1:
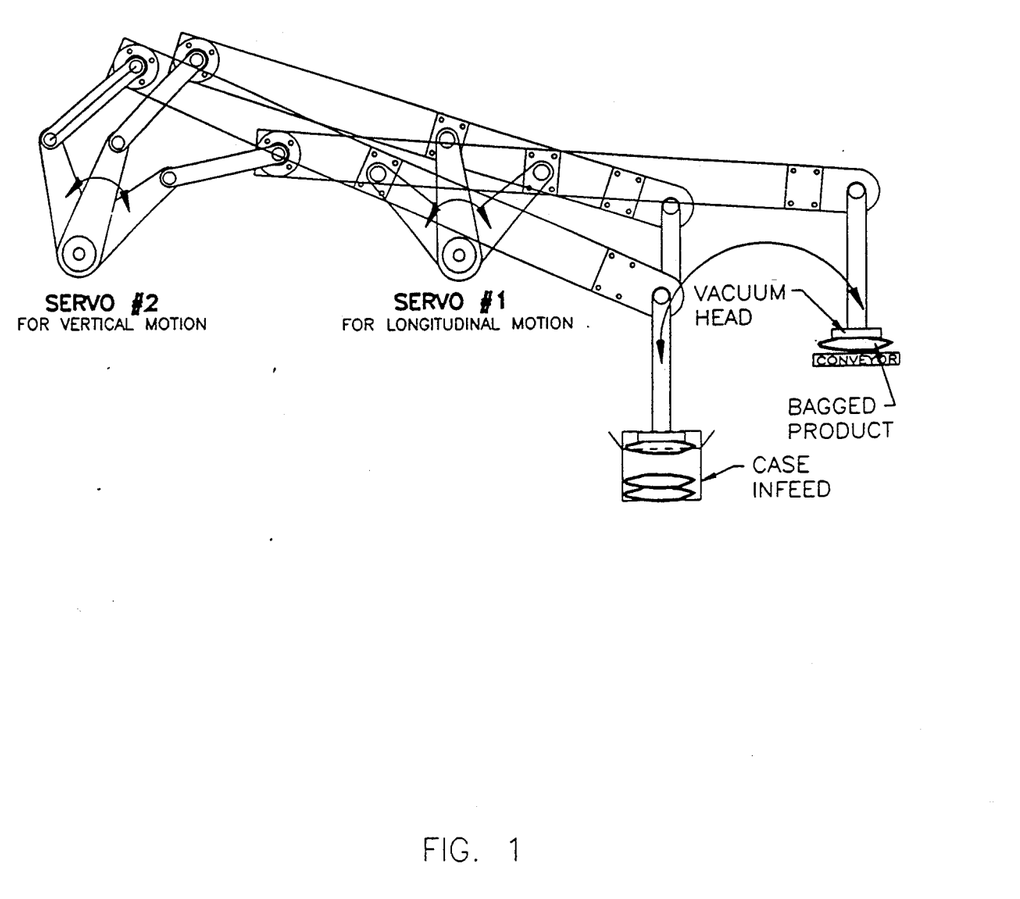
FIG. 1 is a schematic side view of a robotic arm which is believed to be typical of many of the robot arms of the prior art.

While robotic pick and place mechanisms have been utilized in the handling of packaged products for several years, the mechanisms currently known to the inventor all effect movement of the product through the use of a complex linkage that utilizes two or more servos. An example of such a robotic arm is shown in FIG. 1. As is apparent from the apparatus shown in FIG. 1, when two servos are used, the two servos must be accurately synchronized, and complex control algorithms must be used to achieve the required motion. The resulting complexity of the pick and place mechanism typically increases the cost of the mechanism and the need for highly skilled technicians in the event of a maintenance problem.

It is therefore desirable to provide a robotic pick and place mechanism having a simpler mechanical design. Such a mechanism would ideally reduce the cost of constructing the mechanism and reduce the resulting maintenance associated with the mechanism.

SUMMARY OF THE INVENTION

The present invention provides such a robotic arm for moving product from a first handling location (such as a conveyor) to a second handling location (such as a container). The apparatus includes a support structure and a driven shaft mounted to the support structure. The driven shaft is adapted for rotation about a first axis, and means are provided for selectively oscillating the shaft through successive, selected arcs of rotation. A crank arm is secured to the driven shaft at a first point such that the crank arm is rotated about the first axis.

The apparatus also includes a linkage member rotatably secured to the support structure for rotation about a second axis of rotation. The linkage member is rotatably secured to the support structure at a first linkage pivot point on the linkage member.

The robotic arm apparatus further includes an elongated boom member having a first end, a cranking point and a product handling end. The boom member is pivotally connected at its first end to the linkage member at a second linkage pivot point. The boom member is further pivotally connected at its cranking point to the crank arm at a selected crank point on the crank arm.

The first axis of rotation and the second axis of rotation are selectively positioned, and the distances (i) between the first linkage pivot point and the second linkage pivot point; (ii) between the first point (center of rotation) of the crank arm and the crank point of the crank arm; (iii) between the first end of the boom and the cranking point of the boom; and (iv) between the product handling and of the boom and the cranking point of the boom are each selectively chosen such that selected oscillation of the driven shaft (and hence the crank arm) about the first axis rotation effects movement of the product handling end of the boom in a path having an arcuate component and an approximately straight line vertical component. In this manner, successive product may be sequentially lifted (by the upward part of the arcuate component) from a conveyor or other handling station and deposited in a container. In turn, by successively lessening the degrees of oscillation of the driven shaft to shorten the straight line vertical component of the path of the product handling end of the boom, the invention may be used to deposit successive layers of fragile product in a container, while eliminating or minimizing damage to the product.

In a preferred embodiment of the present invention, the robotic arm further includes a material handling linkage member operatively mounted to the product handling end of the boom and a means mounted to the material handling linkage member for selectively securing and releasing product in use. In a more preferred aspect of this embodiment, the invention may further include a means for maintaining the material handling linkage member in a substantially vertical orientation in use.

In a still more preferred embodiment of the present invention, the robotic arm may include a means for producing an actuation signal in response to the presence of an article at a first station for handling. The invention further includes a servo motor adapted to oscillate the driven shaft through selected arcs of rotation. A controller is also provided which is operatively connected to the actuation signal means and to the servo motor to effect selected oscillation by the servo motor in response to actuation signals produced by the actuation signal producing means.

Accordingly, the present invention provides a robotic arm for picking and placing product which performs its function through the use of only one driven shaft (typically utilizing a servo motor). As such, the robotic arm avoids the need to accurately synchronize two servos through the use of complex control algorithms. Rather, the present invention utilizes only a single motor, which may be controlled by a simple controller capable of controlling the operation of the servo through a cycle of successively decreasing degrees of rotation.

These and other advantages of the present invention will be more fully appreciated by the following detailed description of the invention.

BRIEF DESCRIPTION OF THE DRAWINGS

This invention will be further illustrated by reference to the appended drawings which illustrate a particular embodiment of the robotic pick and place mechanism in accordance with the present invention.

FIG. 9 is a side view of the most preferred embodiment of the present invention illustrating a means for maintaining the material handling linkage in a substantially vertical position in use. FIG. 9 includes a ghosted depiction of the linkage to demonstrate different positions of the linkage members during movement of the linkage.

DETAILED DESCRIPTION OF THE PREFERRED EMBODIMENT

It will be understood that the present invention can be implemented in a number of different ways, within the scope of the claims appended hereto. A presently preferred embodiment of the invention will now be described below.

As described above, FIG. 1 illustrates a robotic pick and place apparatus utilizing two servos which is similar to many such devices currently in use in the marketplace.

Figure 2:
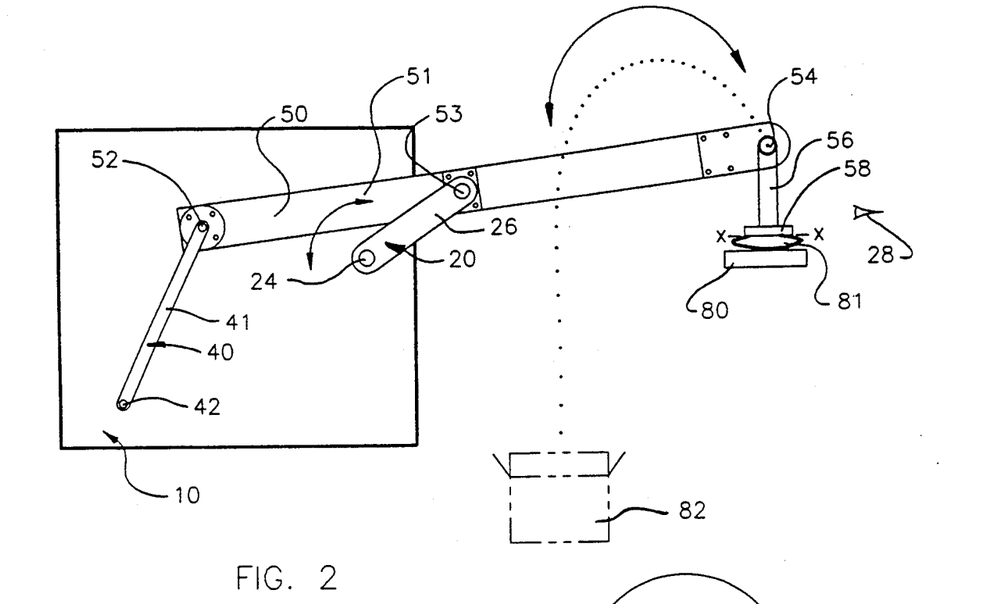
FIG. 2 is a schematic side view of the robotic arm linkage of the present invention illustrating a preferred geometric configuration for the linkage and the path of the product handling end of the boom.
Figure 3:
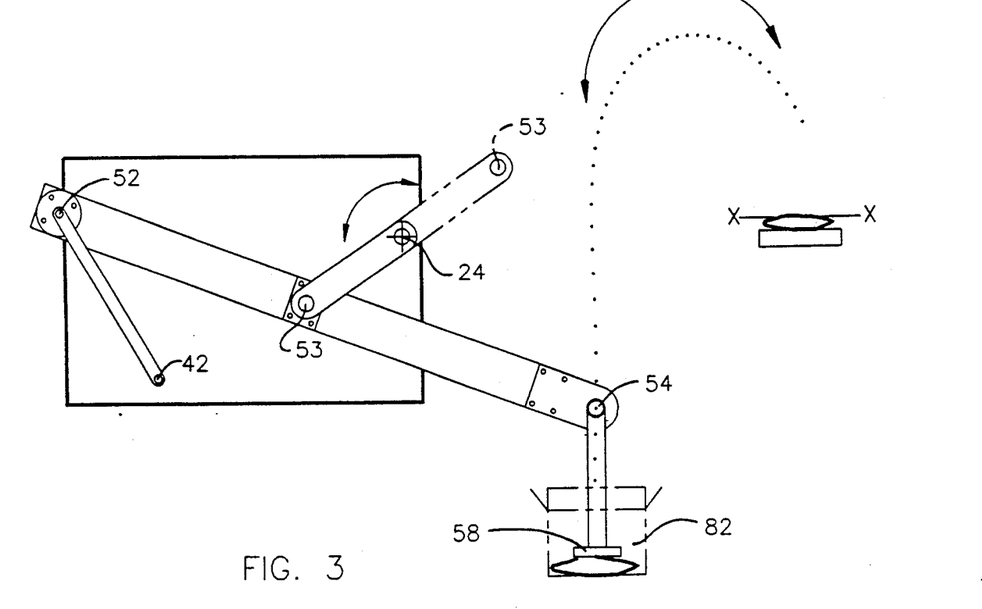
FIG. 3 is a schematic side view of the linkage shown on FIG. 2, illustrating the position of the linkage when depositing a first layer of product in a container.
Figure 9:
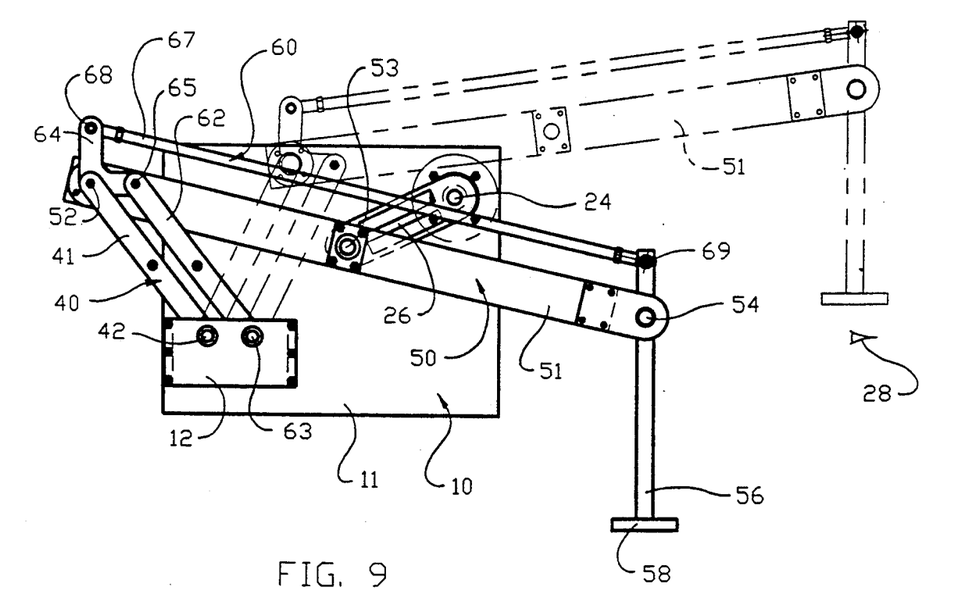

Referring now to FIGS. 2 and 9, the present invention is generally represented by a support structure 10, a crank mechanism 20, a control linkage 40, and a product handling boom mechanism 50.

Referring still to FIGS. 2 and 9, the support structure 10 (shown schematically) may have any of a number of suitable configurations and be comprised of any of the number of suitable combinations of structural members adequate to support the crank mechanism 20, the control linkage 40, and the product handling boom mechanism 50. The support structure 10 may either be a "stand alone" structure having a base adapted to preclude tipping of the robotic arm during operation, or it may be incorporated into a larger product handling system including a conveyor and other devices. As will be apparent from the present disclosure, it is only essential that the product support structure 10 not impede the oscillating rotation of the crank mechanism 20, the control linkage 40, or the product handing boom mechanism 50. At the same time, the support structure 10 must provide a fixed base for such oscillation so that the robotic pick and place mechanism of the present invention does not move relatively to the relevant material handling station. In the embodiment shown in FIG. 9, the support structure 10 includes a fixed base plate 11 and linkage support plate 12. In turn, the fixed base plate 11 is attached to a rigid base frame (not shown). It is not contemplated, however, that there is a particular preferred structure for the support structure. Rather, the configuration and design of the support structure will vary with the particular application involved.

Referring still to FIGS. 2 and 9, the crank mechanism 20 includes a servo motor 21 which is fixedly secured to the support structure 10. The servo motor 21 powers a shaft 24 (hereinafter referred to as driven shaft 24). The driven shaft 24 rotates about a first axis of rotation which is concentric with the shaft 24 as best seen in FIG. 2. A crank arm 26 is secured to the driven shaft 24 such that the crank arm 26 rotates about the axis of rotation of the driven shaft 24.

The crank mechanism 20 may further include a means for selectively oscillating the shaft of 24 through successive, selective arcs of rotation. In the preferred embodiment, the means for selectively oscillating the shaft comprises a means operatively associated with the robotic arm for producing an actuation signal in response to the presence of an article for handling. This means may include any of a number of suitable sensors 28 which are positioned to detect the presence of an article at a first handling station, such as conveyor 80 (shown schematically). The sensor 28, in turn, is operatively connected to a programmable controller 30 (shown schematically), which, in turn, operatively communicates with the servo motor 21 to actuate rotation and oscillation of the driven shaft 24.

It will be appreciated from the present disclosure that any of a number of suitable programmable controllers and a number of suitable sensors could be utilized in accordance with the present invention. Based on the present disclosure, it is believed that such sensors and programmable controllers will be known or readily determined by those with ordinary skill in the art.

Figure 10:
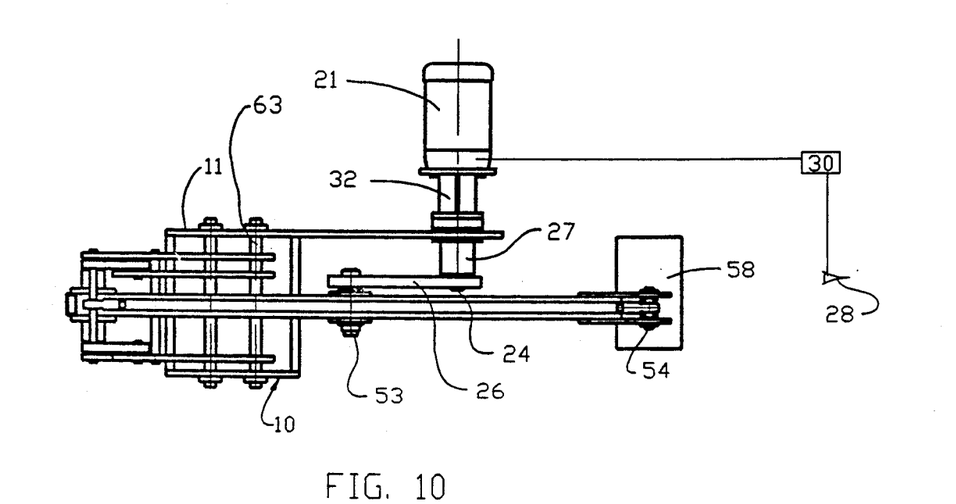
FIG. 10 is a top view of the linkage shown in FIG. 9.

In the most preferred embodiment of the present invention, the crank mechanism 20 may further include controlling mechanisms adapted to the shaft and servo motor to prevent backlash of the driven shaft and ensure smooth operation of the crank arm. Referring to FIG. 10, in the preferred embodiment, the crank mechanism 20 includes an anti-backlash gear reducer 32 (such SM-CYCLO (brand) or Dojen (brand) gear reducers with a reduction of approximately 10:1) connected in line between the servo motor 21 and the shaft 24. The crank mechanism may further include bearings 27 operatively associated with the shaft 24 for supporting and facilitating the rotation of the shaft 24.

Referring again to FIGS. 2 and 9, the present invention also includes a control linkage 40. The control linkage 40 includes a linkage member 41 which is pivotally secured to the support structure 10 at a first linkage point on the linkage member and adapted for rotation about a second axis for rotation as represented by pin 42.

The present invention further includes a product handling boom mechanism 50. The product handling boom mechanism 50 comprises an elongated boom member 51 having a first end corresponding to the end at which linkage pin 52 is disposed as shown in FIGS. 2 and 9, a cranking point corresponding to the location of crank connection 53, and a product handling end corresponding in location to the disposition of the pivotal connection 54. The boom member 51 is pivotally connected at its first end to the linkage member 41 by a suitable means. In the preferred embodiment, the pivotal connection is provided by pin 52 shown in FIGS. 2 and 9.

The boom is further pivotally connected at its cranking point to the crank arm 26 at a point (called the "crank point") along the length of the crank arm 26 (preferably near the end of the crank arm 26) by means of a pin 53 as shown in FIGS. 2 and 9. Hence the pin 53 denotes both the crank point of the crank arm and the cranking point of the boom.

The elongated boom extends a selected distance past the crank point/cranking point pin 53 to the product handling end of the boom, which for operative purposes of the present disclosure is denoted by the pivotal connection 54 between the boom 51 and a material handling linkage member 56. The material handling linkage member 56 is pivotally connected to the boom 51 by pivotal connection 54 (which may be a pin or other pivotal connecting means) in order to allow rotation of the material handling linkage member 56 in response to oscillation of the boom 51 and crank arm 26.

The invention further includes a means for selectively securing or picking up a product and releasing or depositing the product, which means is secured to the material handling linkage member 56. The means may include any of a number of suitable gripping devices such as vacuum head assemblies, clamping assemblies, or other assemblies suitable for selectively securing or releasing a product. In the preferred embodiment, the means for selectively securing and releasing a product comprises a vacuum head 58 operatively connected to the material handling member 56. It will be appreciated by those of skill in the art, however, in light of the present disclosure, that other suitable gripping devices may be utilized in accordance with the present invention.

An important aspect of the present invention is the relative geometry (sizing and location) of the above-described crank mechanism 20, control linkage 40, and product handling boom mechanism 50. It is important that these members be sized and positioned such that the oscillation of the crank mechanism 20 provides a path of movement for the pivotal connection 54 of the boom member 51 which has an arcuate component and an approximately straight component as shown by the dots in FIG. 2. The arcuate component facilitates the handling of fragile product by enabling the boom member 51 to bottom-out at a location directly over a product as shown in FIG. 2. Once the product is secured by the vacuum head 58, the oscillating movement of the crank arm 26 causes movement of the boom member 51, and especially the pivotal connection 54 of boom member 51, in a path that is initially primarily vertical, thereby minimizing the likelihood that such movement will compress the vacuum head 58 into the product and damage the product. The arcuate movement then swings the product clear of the product supply means (designated "80" in FIG. 2). The succeeding straight line component of the path of the pivotal connection 54 then allows movement of the product down into a vertical container, such as box 82, in a manner that minimizes the likelihood that the product will be damaged by striking the side of the container 82.

Figure 8:
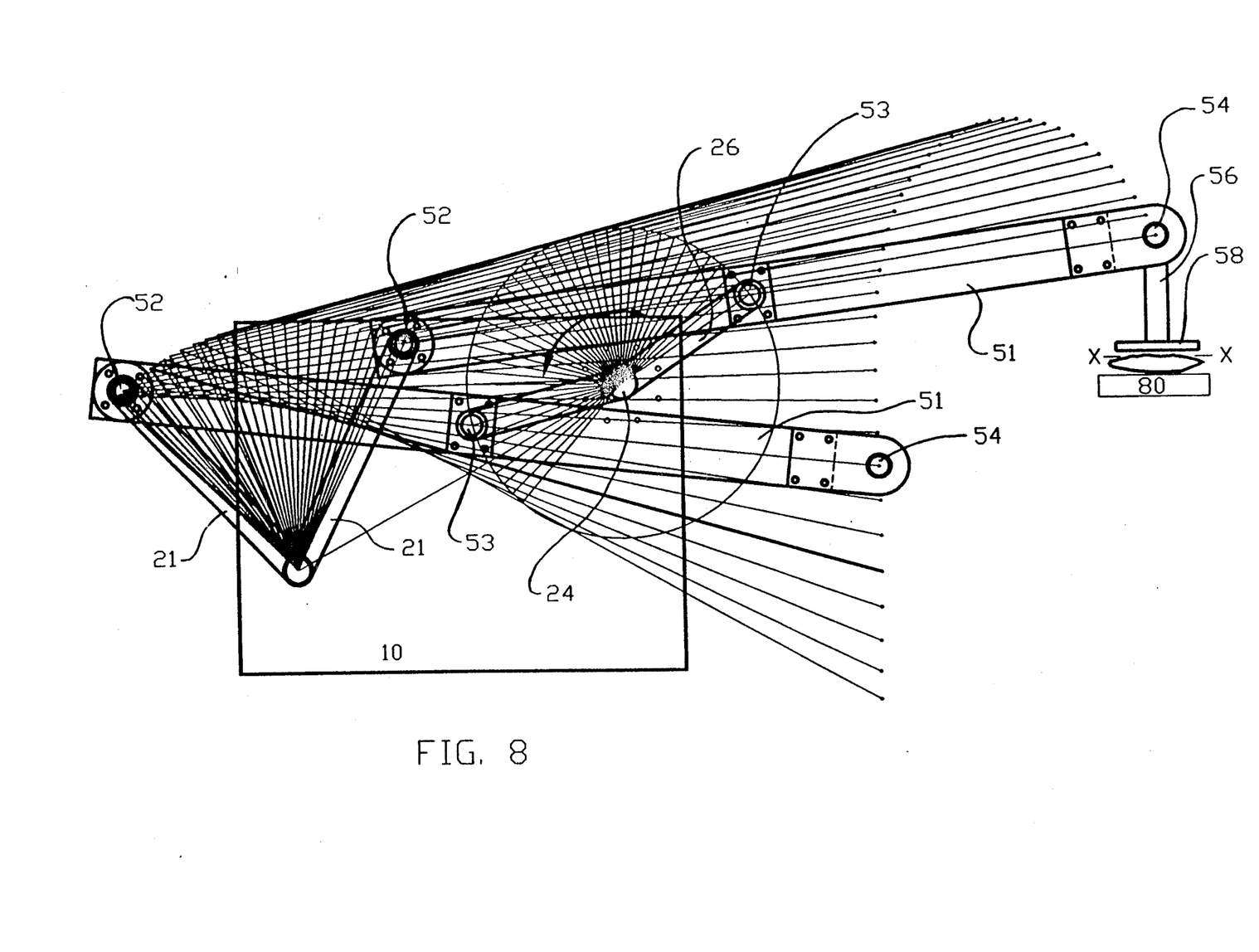
FIG. 8 is a scale plot side view of the apparatus of the present invention, illustrating the geometry and relative positioning of the linkage members, and plotting the path of the product handling end of the boom.

Referring now to FIG. 8, there is shown an accurately proportional drawing of the preferred embodiment of the present invention which plots the path of the pivotal connection 54 for the preferred embodiment of the present invention. As shown in FIG. 8, the position of the driven shaft 24 and the pin 42, and the lengths or distances (i) between the pin 42 and the linkage pin 52; (ii) between the driven shaft 24 and the crank connection 53; (iii) between the linkage pin 52 and the crank connection 53; and (iv) between the crank connection 53 and the pivotal connection 54, are each selectively chosen such that selected oscillation of the crank arm about the first axis of rotation causes movement of the pivotal connection 54 in a path having an arcuate component and an approximately straight line vertical component.

It is believed that the length of the linkages may be varied and that the orientation and positioning of the rotation points (such as the driven shaft) may also be varied to yield similar paths which first lift product away from a first handling station and then deposit product at a second handling station in sequential order as will be described in greater detail below. Such alternative designs will become apparent from the present disclosure and are within the spirit and scope of the present invention.

Referring now to FIGS. 2 through 7, the sequential operation of the present invention is illustrated. Referring first to FIG. 2, the apparatus of the present invention is shown over the product supply means 80 receiving a first piece of product 81. The product supply means 80 may comprise any of a variety of conveying means adapted to supply product to a product handling location for handling by the pick and place robotic arm of the present invention. One such suitable conveying means is described in U.S. Pat. No. 5,123,231 (of which Applicant is a co-inventor), which patent is hereby fully incorporated by reference herein.

The arrival of the product 81 to the first handling location 80 is sensed by the sensor 28, which sends a signal to the controller 30. The controller 30 then actuates rotation of the servo motor 21 and driven shaft 24 to rotate the crank arm 26 to cause the boom member 51 (and correspondingly the vacuum head 58) to move into the position shown in FIG. 2. The controller then causes the vacuum head 58 to secure the product 81 and reverses the rotation of the driven shaft 24 to lift the product 81 from the product supply means 80. The controller then causes the driven shaft 24 to rotate through a selected number of degrees of rotation (in the preferred embodiment approximately 180 degrees), after which the controller 30 causes the vacuum head 58 to release the product into the case 82. The controller 30 then causes the servo motor 21 to oscillate back a selected number of degrees of rotation to a position over the product supply means 80 for securing another piece of product. In the preferred embodiment, product is supplied at a rate which allows substantially continuous oscillation of the crank arm 26 between the depositing of product and the picking up of additional pieces of product. It will be appreciated by those of skill in the art, however, that in certain applications, it may be desirable to stop the return of the vacuum head 58 around the top of the arcuate component of the path of the pivotal connection 54.

Once a second piece of product is supplied to the first handling location by the product supply means 80, the piece of product is again sensed by the sensor 28 and the driven shaft 24 and crank 26 are actuated to move the boom 51 to lower the vacuum head 58 over the product. The vacuum head 58 is then actuated to secure the product and the rotation of the driven shaft 24 is reversed to again lift the product away from the product supply means 80 as shown by the dotted line in FIG. 4.

Figure 4:
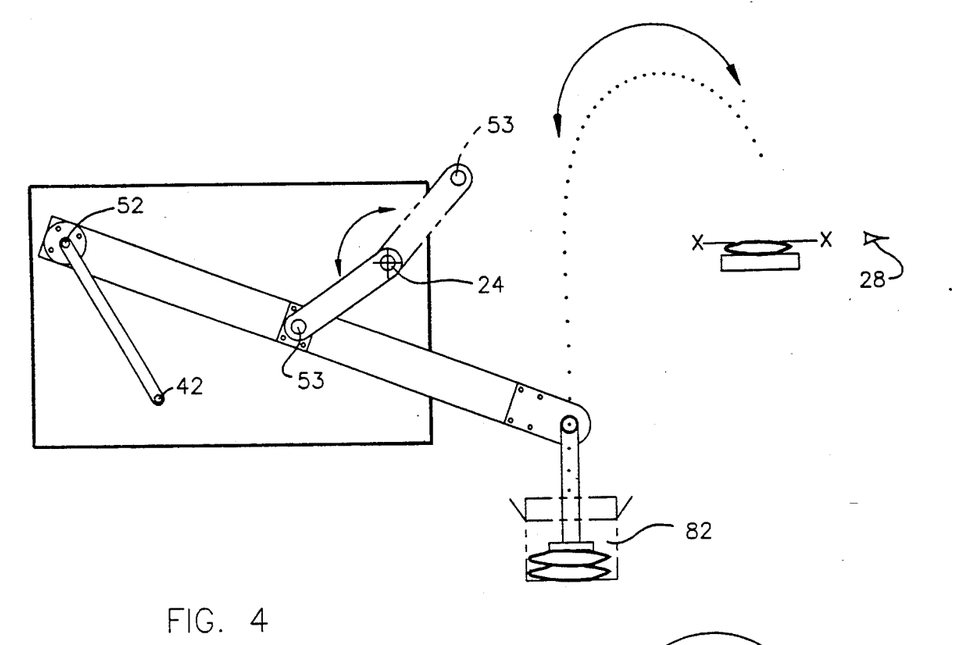
FIG. 4 is a schematic side view of the linkage of FIG. 2 showing the positioning of the linkage upon the deposit of the second layer of product in a container.

The driven shaft 24 is then rotated through a selected number of degrees of rotation, less than the number of degrees of rotation for depositing the first product, such that the product is lowered to a position above the first piece of product contained in the case 82. In the preferred embodiment, the driven shaft 24 rotates approximately 160 degrees to obtain the desired height above the first piece of product.

Figure 5:
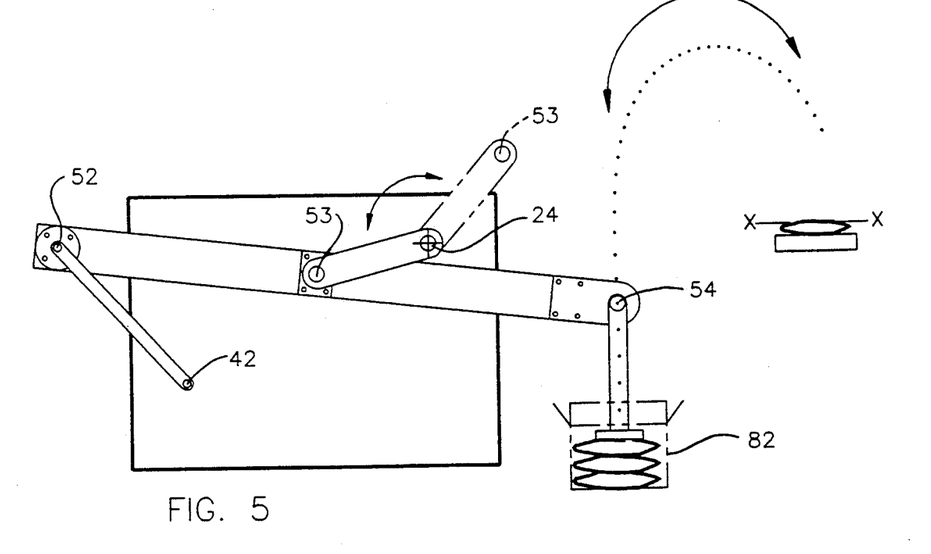
FIG. 5 is a schematic side view of the linkage of FIG. 2 illustrating the positioning of the linkage upon the depositing of a third layer of product in a container.
Figure 6:
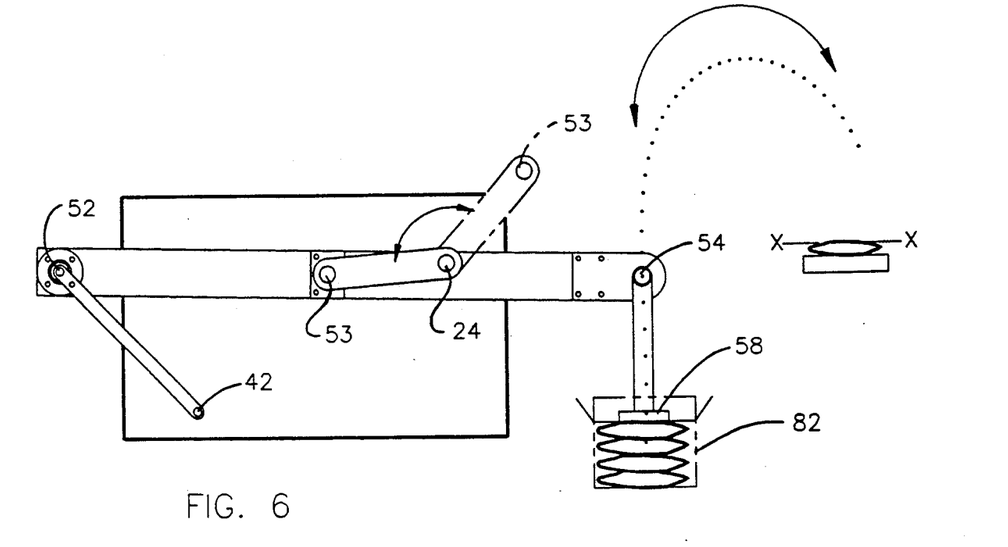
FIG. 6 is a schematic side view of the linkage of FIG. 2 showing the relative position of the linkage when depositing a fourth layer of product in a container.
Figure 7:
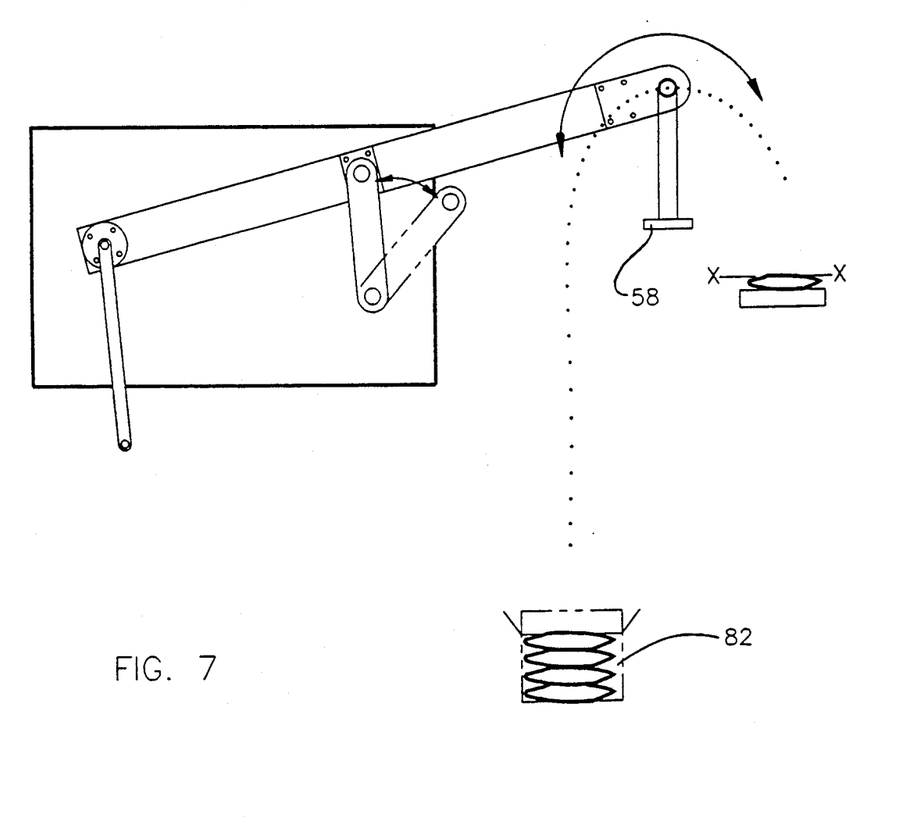
FIG. 7 is a schematic side view showing the position of the linkage at the top of the arcuate portion of the path of the product handling end of the boom.

In the preferred embodiment, this process is repeated as shown in FIGS. 4, 5 and 6 until, for example, four pieces of product are deposited within the case 82. For the third piece of product, the driven shaft is rotated approximately 140 degrees in the preferred embodiment. For the fourth piece of product, the shaft is rotated approximately 120 degrees. In the preferred embodiment, only four pieces of product are stacked in a row within a box 82. The box 82 is then removed and another box is inserted to receive additional products.

Hence, by sequentially decreasing the number of degrees of rotation of the driven shaft 24 for each oscillation, the present invention sequentially stacks layers of product within a case 82 without compressing the product. The present invention thereby enables the stacking of fragile product within a case without damaging the product.

As will be appreciated from the above disclosure, it is desirable to maintain the material handling linkage member 56 in a substantially vertical position so that the product held by the vacuum head 58 at the end of the linkage member 56 does not strike the sides of the case 82 and damage the product. Referring now to FIGS. 9 and 10, a means for maintaining the material handling linkage member 56 in a vertical orientation is shown. This means includes a parallel linkage assembly 60 comprising a second linkage arm 62 pivotally mounted to the support structure 10 by a second linkage pin 63. The second linkage pin 63 is positioned to be horizontally aligned with the pin 42 in use. The parallel linkage assembly 60 further includes a right angle (or L-shaped) linkage member 64 which is pivotally connected to the second linkage arm 62 by a parallel pin 65 and also pivotally connected to the first linkage member 41 at linkage pin 52. The right angle linkage member 64 is pivotally connected to the linkage member 41 and the second linkage arm 62 such that the distance from pin 42 to pin 52 is substantially equal to the distance from pin 63 to parallel pin 65. Similarly, the distance between pin 52 and pin 65 is substantially equal to the distance between pin 42 and pin 63 such that linkage member 41 and linkage member 62 move parallel to each other during oscillation of the crank member 26.

A parallel connecting member 67 is pivotally connected to the right angle linkage member 64 by a pin 68 as shown in FIG. 9. The parallel connecting member 67 is also pivotally connected to the material handling linkage member 56 by pin 69 at a point such that the distance between the pin 69 and the pivotal connection 54 is substantially equal to the distance between the pin 68 and the linkage pin 52. In turn, the distance from pin 68 to pin 69 is substantially equal to the distance from pin 52 to pivotal connection 54. As shown in FIG. 9, therefore, oscillation of the crank 26 will result in movement of the boom 51 which is constrained by the control linkage mechanism 40 to move in the path shown by the dots shown in FIG. 2. In turn, the geometry of the parallel linkage assembly 60 will result in the right angle linkage member 64 maintaining a horizontal/vertical orientation. Since the material handling linkage 56 is constrained to remain parallel to the vertical leg of the right angle linkage member 64, the material handling linkage member 56 will thereby be maintained vertical throughout the oscillation of the crank 26.

The instant invention has been disclosed in connection with a specific embodiment. However, it will be apparent to those skilled in the art that variations from the illustrated embodiment may be undertaken without departing from the spirit and scope of the invention. For example, for slow speed applications, a standard reversing brake motor may be used instead of a servo drive motor. This and other variations will be apparent to those skilled in the art in view of the above disclosure and are within the spirit and scope of the invention.

As used in this specification and in the appended claims, it should be understood that the word "connect" or any derivative thereof implies not only a direct, immediate connection between two recited parts, but also embraces the various arrangements wherein the parts are operatively connected, although other elements may be physically located or eliminated between the connected parts. Further, the word "a" does not preclude the presence of a plurality of elements accomplishing the same function.

What is claimed is:

1. A robotic arm for moving product from a first handling location to a second handling location, comprising:
    (a) a support structure;
    (b) a driven shaft mounted to the support structure and adapted for rotation about a first axis;
    (c) means for selectively oscillating the shaft through successive, selected arcs of rotation;
    (d) a crank arm secured to the driven shaft at a first point such that the crank arm is rotated about the first axis;
    (e) a linkage member rotatably secured to the support structure for rotation about a second axis, the linkage member being rotatably secured to the support structure at a first linkage pivot point on the linkage member; and
    (f) an elongated boom member having a first end, a cranking point and a product handling end, the boom member being pivotally connected at its first end to the linkage member at a second linkage pivot point, and further being pivotally connected at its cranking point to the crank arm at a crank point on the crank arm,
    wherein the first axis of rotation and the second axis of rotation are selectively positioned, and the distances (i) between the first linkage pivot point and the second linkage pivot point; (ii) between the first point of the crank arm and the crank point of the crank arm; (iii) between the first end of the boom and the cranking point of the boom; and (iv) between the cranking point of the boom and the material handling point of the boom are each selectively chosen such that selected oscillation of the crank arm about the first axis of rotation effects movement of the product handling end of the boom in a path having an arcuate component and an approximately straight line component.

2. The robotic arm of claim 1 further comprising a material handling linkage member, operatively mounted to the product handling end of the boom and a means mounted to the material handling linkage member for selectively securing and releasing a product in use.

3. The robotic arm of claim 2 further comprising a means for maintaining the material handling linkage member substantially vertical in use.

4. The robotic arm of claim 1 wherein the means for selectively oscillating the shaft comprises a servo motor adapted to oscillate the shaft through selected arcs of rotation.

5. The robotic arm of claim 1 wherein the means for selectively oscillating the shaft comprises:

(a) a means operatively associated with the robotic arm for producing an actuation signal in response to the presence of an article for handling;

(b) a servo motor adapted to oscillate the shaft through selected arcs of rotation; and (c) a controller operatively connected to the actuation signal means and servo motor to effect selected oscillation by the servo motor in response to an actuation signal produced by the actuation signal producing means.

* * * * *